(12) United States Patent
Rolet et al.

(10) Patent No.: US 9,020,772 B2
(45) Date of Patent: Apr. 28, 2015

(54) AIRCRAFT STRUCTURE TESTING DEVICE OF THE WIRE CUTTER TYPE

(75) Inventors: Sébastien Rolet, Plaisance du Touch (FR); Nicolas Dominguez, Tournefeuille (FR)

(73) Assignee: European Aeronautic Defence And Space Company EADS France, Paris (FR)

( * ) Notice: Subject to any disclaimer, the term of this patent is extended or adjusted under 35 U.S.C. 154(b) by 1059 days.

(21) Appl. No.: 12/811,586

(22) PCT Filed: Dec. 26, 2008

(86) PCT No.: PCT/FR2008/052421
§ 371 (c)(1),
(2), (4) Date: Apr. 4, 2011

(87) PCT Pub. No.: WO2009/083699
PCT Pub. Date: Jul. 9, 2009

(65) Prior Publication Data
US 2011/0231125 A1   Sep. 22, 2011

(30) Foreign Application Priority Data

Jan. 3, 2008   (FR) ..................................... 08 50017

(51) Int. Cl.
*G06F 19/00*   (2011.01)
*G01B 7/16*   (2006.01)

(52) U.S. Cl.
CPC ... *G01B 7/16* (2013.01); *G01B 7/18* (2013.01)

(58) Field of Classification Search
USPC ........................................................ 702/64
See application file for complete search history.

(56) References Cited

PUBLICATIONS

Detecting defects in complex wiring systems, the AMMTIAC Quarterly, vol. 1, No. 2, 2006, 16 pages.*
International Search Report dated Jun. 16, 2009.

* cited by examiner

*Primary Examiner* — Tung S Lau
(74) *Attorney, Agent, or Firm* — RatnerPrestia

(57) ABSTRACT

A detection wire cutter including a conducting wire mechanically secured to a structure that is to be monitored. This wire is electrically powered at one end and at another end feeds back an electrical voltage corresponding to the power supplied, provided that the structure that is to be monitored has not undergone unacceptable mechanical damage. As an improvement, two arrays of wires extending over flat supports in two directions in space are proposed. Each array is powered by a distinct network electrical supply. The two networks extend in layers, with parallel wire portions. The position of a crack does not impede the passage of current between certain terminals, but certain other terminals will no longer receive any current because the crack has broken a network supply general connection between the connection of one wire and that of another.

10 Claims, 2 Drawing Sheets

AIRCRAFT STRUCTURE TESTING DEVICE OF THE WIRE CUTTER TYPE

FIELD OF THE INVENTION

The invention relates to aircraft structure testing devices of the wire cutter type. It concerns non-destructive checking operations, for the maintenance, for example in the aircraft field, typically of aircraft structure junctions, for example between fuselage shrouds and longitudinal stiffeners.

BACKGROUND

Detection of fatigue fissures in aircraft structures is a very onerous maintenance operation when the part to be inspected is not easily accessible and requires dismounting operations. One current solution consists in manually checking, by means of eddy currents, a crack initiating surface, which requires to dismount some structural elements. The problem lies thus in detecting the apparition of fatigue cracks and in determining their length and position without requiring dismounting operations.

Sensors, previously installed such as wire cutter sensors or eddy current sensors or even acoustical detection sensors, contribute to reduce the costs involved as they prevent the environment of the piece to be monitored from being dismounted during the checking operations. Any technology has however its own advantages and drawbacks.

A detector of the wire cutter type uses an electrically conducting wire stuck on the fissure initiating surface. This detector enables to detect the possible apparition of a crack by testing the electrical continuity of the conducting wire. The wire is cut when the crack extends at the point where it is stuck. This solution is disadvantageous in that it gives a binary indication and does not enable either to estimate the length of the crack or to locate it for the breaking is likely to appear anywhere along the length of the conducting wire.

The invention uses the wire cutter principle, the innovation lying in its pattern which notably enables to estimate both the length and position of the fissure. According to this new pattern, instead of having one wire in the wire cutter, a lot of wires are arranged and connected in two arrays. Both arrays can be moreover interconnected for simplification reasons. The arrays form then a mesh network, preferably in a perpendicular arrangement, in order to precisely locate the damage.

SUMMARY OF THE INVENTION

Thus, the invention aims at an aircraft structure testing device of the wire cutter type, comprising
 a conducting wire, mechanically secured to a structure to be monitored, and
 connected at one end to an electrical supply and outputting at another end an electrical current and/or voltage corresponding to the supply, if no unacceptable mechanical damage has been done to the structure to be monitored, characterized in that it comprises
 two wire arrays extending on flat supports in two spatial directions,
 the supports being secured to the structure,
 each array being connected to a distinct electrical array supply,
 each wire of a wire array being connected to the electrical array supply of the array it belongs to,
 both arrays extending in layers, with portions of wires being disposed in a parallel arrangement,
 parallel portions of wires of one array being oriented in a direction perpendicular to that of the portions of the other array.

BRIEF DESCRIPTION OF THE DRAWINGS

The invention will be better understood from the following description and the accompanying figures. These figures are given only as an indicative, and not at all as a limitative, representation of the invention. In the figures.

DETAILED DESCRIPTION

Figure 1:
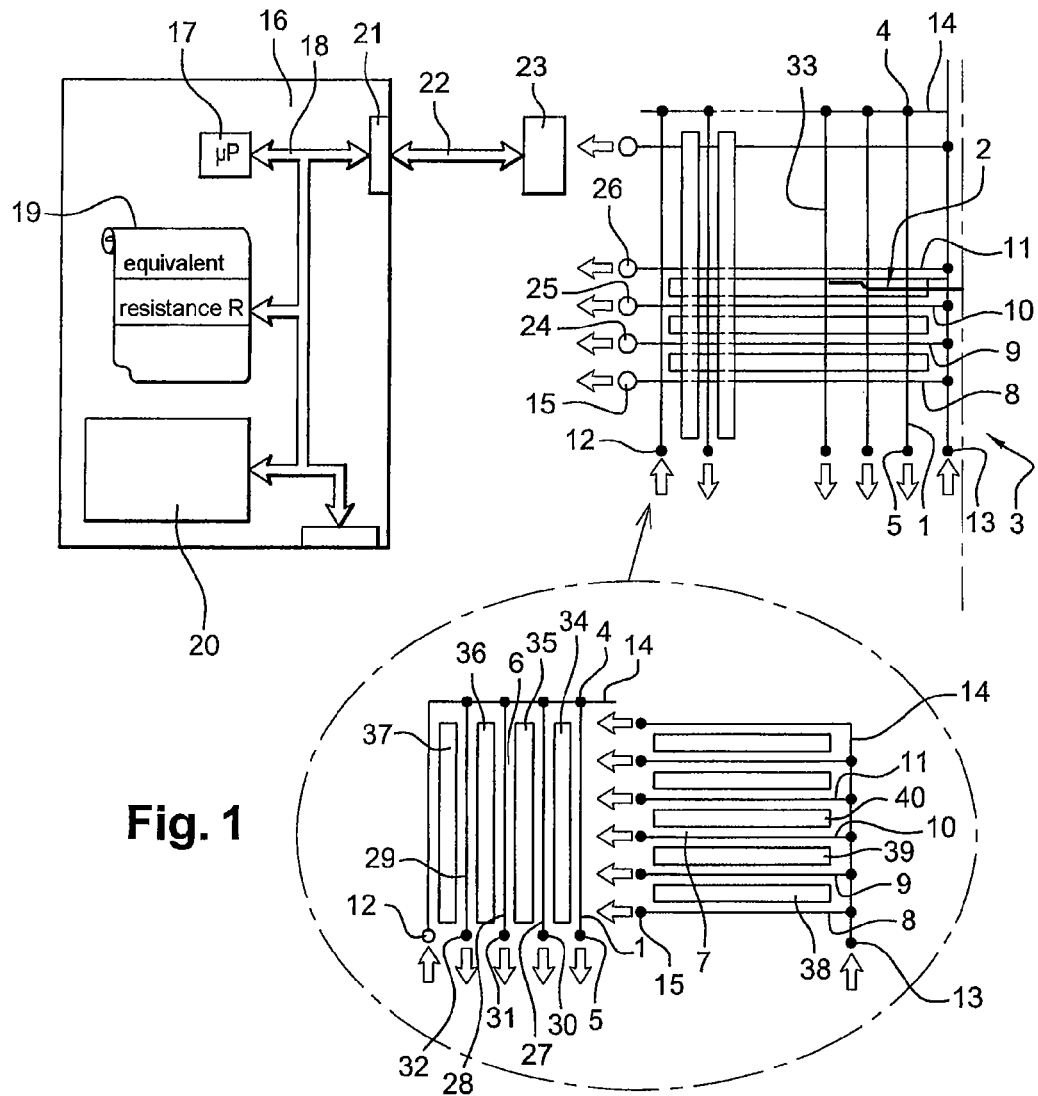
FIG. 1 shows a device according to the invention having a matrix geometry of a wire cutter.

FIG. 1 shows a device according to the invention. This device comprises a conducting wire, for example the wire 1, secured to a structure to be monitored. The structure, not represented, is for example flat. But it could have a step or corner edge configuration, even a boss configuration or other. In practice, the conducting wire 1 is fixed to a support, for example a layer of polytetrafluorethylen, metallized on one face, and cut for uncovering the conducting wire 1. This layer is then firmly stuck on the structure and thus follows the outline thereof. Particularly, a fissure 2 extending into the structure, for example from an edge 3 of this structure, results in the breaking of the wire 1.

For detecting the breaking, the wire 1 is supplied at one end 4 with an electrical voltage and/or current. Another end 5 outputs the voltage and/or current by electrical conduction. The drawback of such a device lies in the fact that the localization of the fissure at a particular place of the wire 1 is not possible. The voltage, output at 5, enables to know, only in a binary manner, whether the fissure 2 is present or not.

According to the invention, the device comprises two arrays of wires: the arrays 6 and 7, represented separately in a magnification of a detail in FIG. 1. Both arrays are in fact stuck to one another, and together firmly stuck on the structure to be monitored. Both arrays form then a mesh network. These both arrays extend on this structure, each on its own flat support, in a spatial direction different from that in which the other array extends. Thus, the array 6 extends in a direction, represented here in FIG. 1, perpendicular to the direction of its conducting wires such as 1. The conducting wires of one array are parallel to one another. For the array 1, they all are parallel to the wire 1. The array 7 extends in a direction, here vertical, perpendicular to the direction of its conducting wires, or at least perpendicular to the portions 8 to 11 of its conducting wires which are parallel to one another. The portions are parallel to one another and are perpendicular to the extension direction of the array 7.

The supports are secured to the structure supporting them and are subjected together with it to deformations and breakings this structure has suffered.

While the array 6 is connected to an electrical array supply through a terminal 12, the array 7 is supplied through an array terminal 13, distinct from the terminal 12. Both arrays are connected to distinct supplies. "Distinct supplies" does not necessarily mean a different electric voltage or waveform. But, possibly and preferably, it also means one time-shared supply. Notably, in this preferred last case, both arrays can be connected to one another through a common terminal 14.

The arrays are formed in such a manner that the wires of each wire array are connected to the electrical array supply of the array they belong to. Thus, all the wires 8 to 11 of the array 7 are connected to the terminal 13. In the figures representing the arrays, when electrical connections are established, points at wire intersections represent these connections. Thus, each array can comprise a general connection oriented in the extension direction of the array and to which all the conducting wires of the array will progressively be connected.

While both arrays extend in layers, with portions of wires having a parallel configuration, the portions of wires of one array are oriented in a direction perpendicular to that of the portions of the other array.

In one embodiment, the electric continuity of the injection point, 12 or 13, at each of the reading terminals such as 5 for the array 6, or respectively 15 for the array 7, can be sequentially tested for determining the position of the crack. For this purpose, the device comprises, or is associated to, an electronic circuit 16 provided with a microprocessor 17 connected, through an address, data and control bus 18, to a program memory 19, to a data memory 20 (for recording measure results) and to an input/output interface 21. The interface 21 is in communication with a transport bus 22 (typically an aircraft bus). The bus 22 is connected to a decoder 23 located in the vicinity of or on the support of the arrays 6 and 7. The decoder 23 is connected on one hand to the bus 22 and on the other hand to the injection terminals 12 and 13, and to the reading terminals such as 5 and 15. Under the control of the processor 23, the decoder is used for successively, or even simultaneously but separately, acting upon the output connections.

When an array is supplied, the method enables to determine an interval between two wires where the crack 2 is located. For example for the array 7, the position of the crack 2 does not indeed disturb the passage of the current between the terminal 13 and the terminal 15, any more than between the terminal 13 and the terminal 24 or the terminal 25 of the conducting wires 8 and 9 which are the closest to the wire 8. On the other hand, the terminal 26 supplied by the wire 11 does not receive current anymore for the fissure extending from the edge 3 has broken the general connection supplying the array 7 between the connection of the wire 10 and that of the wire 11.

In the case of the array 7, the most important thing is that the general connection should be carried by the structure it is supposed to monitor. It is this general connection that accounts for the breaking since it is broken too. It is also possible that the wires 8 to 11 are not themselves submitted to the constraint. For example, where they are located, the support is not stuck on the structure.

While the position of the fissure 2 (between the wires 10 and 11) can thus be determined with the array 7, its extension, its length, can be determined with the array 6. The conducting wire 1, located between the terminal 4 and the terminal 5, is cut first by the fissure 2. It is then sufficient to know which wire among the wires 1 and 27 to 29 of the array 6 is the first one to give an answer for measuring the length of the fissure. In the same way, the continuity of the injection point 12 at each of the reading points 30 to 32 is sequentially tested in order to determine the crack length (in fact a length interval). In the case of the array 6, the general connection leading to the particular connections is not cut (preferably shall not be cut). Only the particular connections 1a 27 to 29 are likely to be cut.

When applied to the structure at the place to be monitored, such a device requires then that the leading edge of the fissure, the edge 3, should be parallel to the general connection of the array 7 and to the particular connections of the array 6. If the fissure extends in another direction, it is suitable that these general and particular connections should be perpendicular to it.

Otherwise, if the extension direction of the fissure is unknown, or if all the conducting wires are carried by the fissure, it is all the same possible, thanks to the last supplied wire 10 of the array 7 and to the last supplied wire 33 of the array 6, to known the limits of this fissure 2.

In another embodiment, the reading terminals such as 5 and 30 to 32, or such as 15 and 24 to 26, can be connected to one another for example by means of an electrical conductor or of the decoder 23. Such connections thus form two independent electrical circuits, one used for determining the position with the array 7, the other for determining the crack length with the array 6. The resistance of the so-formed electrical circuits is then modified when a part of the wires is cut. Each conducting wire has indeed an electrical resistance in parallel with that of the other conducting wires.

If the resistances of the conducting wires are named R1, R2, RN, the equivalent resistance R of such a circuit with N wires is $1/R=1/R1+1/R2+\ldots+1/RN$. If the wires 1 to k are cut by the fissure, the resistance R of the circuit becomes $1/R=1/Rk+1+1/Rk+2+\ldots+1/RN$. The measure of the total resistance of the circuit thus enables to know the number of wires that have been cut and in consequence the length, or respectively the position, of the fissure.

According to the method used, the microprocessor 17 will implement a program of sequential measures or of the measure of an equivalent resistance.

The electrical tracks or wires can be supported by a flexible substrate such as a layer of polytetrafluorethylen metallized or directly deposited on the surface of the piece. Preferably, the flexible substrate and the tracks have a maximal deformation which is superior to that of the material of the monitored structure, in order to prevent a track from being broken before the extension of the fissure under it.

In the case of a flexible substrate solution it is also possible that the different tracks should be deposited on their own independent support, or on a unique support cut into thin strips in order to prevent the wires from being cut because of the movements of the flexible substrate, which could result in an erroneous measure of the length or position of the fissure.

For example, in the represented detail, we can see between the particular connections 1, 27, 28, 29, and the general connection long notches 34 to 37. These notches 34-37 are long and parallel to the connections 1 and 27 to 29. Also, the notches 38 to 40 are located between the particular connections of the second array 7. These notches do not extend up to the general or particular connection intended to detect the fissure.

The wire cutter solution is interesting if the device can be remotely interrogated, even without any wire for example without the bus 22, which prevents the piece from being dismounted. However, the invention substantially relates to the device pattern, whatever the technique used for the interrogation.

Figure 2:
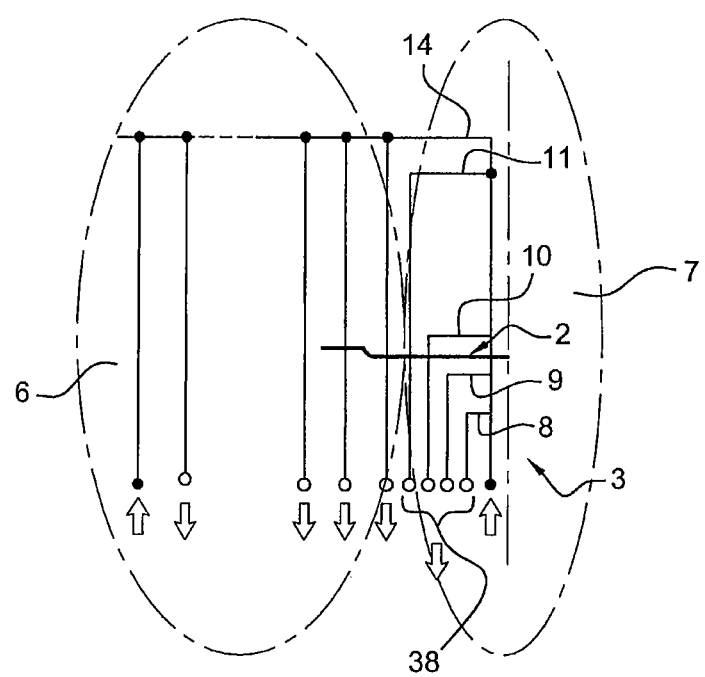
FIG. 2 shows a variant of the wire cutter having a comb-shaped geometry.

In both geometric configurations in FIGS. 1 and 2, the horizontal and vertical distances between the wires can be adapted to the contemplated application (dimensions of the piece, critical fissure length, . . . ).

The FIG. 2 shows another embodiment of the device of the invention. According to this other comb-shaped embodiment, both arrays are juxtaposed on the surface to be monitored instead of being superposed as in FIG. 1. The connection point 14 can be maintained. The array 7 is placed immediately close to the expected place 3 for the fissure. In that case, the useful connections of the array 7 comprise parallel portions 8 to 11 connected, through perpendicular back bends and connections, to an assembly 38 of terminals aligned with the terminals of the reading connections of the array 6. In this variant, as in the first variant, the connections can be sequentially or simultaneously read, by measuring then the equivalent resistance. In the case of FIG. 2, the back connections are preferably not involved. They are supported for example by a part of the support which is not stuck on the structure to be monitored.

The invention claimed is:

1. Aircraft structure testing device of the wire cutter type, comprising:
   a conducting wire mechanically secured to a structure to be monitored, and connected at one end to an electrical supply and outputting at another end an electrical current and/or voltage corresponding to the supply, if no crack exists in the structure of said aircraft to be monitored,
   two independent wire arrays extending on flat supports in two spatial directions,
   the supports being secured to the structure,
   each array being connected to a distinct electrical array supply,
   all the wires of a wire array being connected to the electrical array supply of the array they belong to,
   both arrays extending in layers, with portions of wires being arranged in a parallel configuration, and
   portions of wires of one array being oriented in a direction perpendicular to that of the portions of the other array.

2. Device according to claim 1, further comprising:
   a microprocessor and a program memory for putting into service, successively in time, each of the electrical supplies and for measuring electrical signals output by the array in service.

3. Device according to claim 2, wherein
   the microprocessor and the program memory which measure, successively in time, electrical potentials and/or currents output by each of the conducting wires in service.

4. Device according to claim 3, further comprising:
   a decoder controlled by the microprocessor.

5. Device according to claim 4, further comprising:
   a parallel connection of the conducting wires of an array and
   in the program and the microprocessor, a function for measuring the equivalent resistance, in order to deduce the damage position.

6. Device according to claim 5, further comprising:
   a layer of polytetrafluorethylene, one face of which is metallized and which is cut with a definition corresponding to that of an array of wire portions.

7. Device according to claim 6, further comprising:
   for an array, a unique support cut into thin strips.

8. Device according to claim 7, wherein
   both arrays form a matrix pattern.

9. Device according to claim 8, wherein
   both arrays form a comb-shaped pattern.

10. Device according to claim 9, wherein both arrays are interconnected together.

* * * * *